(12) United States Patent
Lutke et al.

(10) Patent No.: US 8,393,576 B2
(45) Date of Patent: Mar. 12, 2013

(54) VARIABLE PITCH AIRFOILS

(75) Inventors: Kevin Reed Lutke, Huntington Beach, CA (US); Aaron Jonathan Kutzmann, Long Beach, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/445,708

(22) Filed: Apr. 12, 2012

(65) Prior Publication Data

US 2012/0211598 A1     Aug. 23, 2012

Related U.S. Application Data

(62) Division of application No. 12/633,251, filed on Dec. 8, 2009, now Pat. No. 8,342,451.

(51) Int. Cl.
*B64C 3/00* (2006.01)
(52) U.S. Cl. .......... 244/123.11; 244/219; 244/123.1
(58) Field of Classification Search .......... 244/12.11, 244/123.1, 219
See application file for complete search history.

(56) References Cited

U.S. PATENT DOCUMENTS

| | | | |
|---|---|---|---|
| 2,979,287 A | 4/1961 | Ross | |
| 3,047,257 A | 7/1962 | Chester | |
| 3,184,187 A * | 5/1965 | Isaac | 244/218 |
| 3,711,039 A | 1/1973 | James | |
| 3,930,626 A | 1/1976 | Croswell, Jr. | |
| 3,957,232 A | 5/1976 | Sebrell | |
| 4,261,534 A | 4/1981 | Roselli | |
| 4,349,169 A | 9/1982 | McAnally | |
| 4,979,700 A * | 12/1990 | Tiedeman et al. | 244/99.2 |
| 5,181,678 A * | 1/1993 | Widnall et al. | 244/219 |
| 5,566,908 A | 10/1996 | Greenhalgh | |
| 5,697,579 A | 12/1997 | Hayashi | |
| 6,015,115 A | 1/2000 | Dorsett et al. | |
| 6,082,667 A | 7/2000 | Haggard | |
| 6,138,956 A * | 10/2000 | Monner | 244/215 |
| 6,199,796 B1 | 3/2001 | Reinhard et al. | |
| 6,260,797 B1 | 7/2001 | Palmer | |
| 6,264,136 B1 * | 7/2001 | Weston | 244/48 |
| 6,347,769 B1 | 2/2002 | To et al. | |
| 6,419,189 B1 | 7/2002 | DiChiara, Jr. et al. | |
| 6,431,100 B2 | 8/2002 | Abshier | |
| 6,536,712 B1 | 3/2003 | Barenett | |
| 6,568,640 B1 | 5/2003 | Barnett | |
| 6,786,456 B2 | 9/2004 | Veal et al. | |
| 7,185,851 B2 | 3/2007 | Elam | |
| 7,424,988 B2 | 9/2008 | McDonnell | |
| 7,770,962 B1 * | 8/2010 | Maxwell | 296/180.5 |
| 7,777,165 B2 | 8/2010 | Sanderson et al. | |
| 7,963,485 B2 | 6/2011 | Koneczny | |
| 8,042,772 B2 | 10/2011 | Lutke et al. | |
| 2001/0047745 A1 * | 12/2001 | Abshier | 114/102.1 |
| 2004/0046085 A1 | 3/2004 | Veal et al. | |
| 2005/0151007 A1 | 7/2005 | Cadogan et al. | |
| 2005/0191930 A1 | 9/2005 | Foster et al. | |

(Continued)

OTHER PUBLICATIONS

USPTO Requirement for Restriction dated Mar. 2, 2012 for U.S. Appl. No. 12/633,251, 9 pages.

(Continued)

*Primary Examiner* — Christopher P Ellis
*Assistant Examiner* — Medhat Badawi
(74) *Attorney, Agent, or Firm* — Yee & Associates, P.C.

(57) ABSTRACT

An apparatus may comprise an inflatable control surface for an aircraft and an end of the inflatable control surface configured for attachment to a fuselage of the aircraft. The end of the inflatable control surface may be configured to be rotated about an axis to control movement of the aircraft during flight.

4 Claims, 10 Drawing Sheets

U.S. PATENT DOCUMENTS

| | | | |
|---|---|---|---|
| 2009/0108135 A1 | 4/2009 | Shaw | |
| 2009/0206192 A1* | 8/2009 | Sanderson et al. | 244/3.27 |
| 2009/0206196 A1* | 8/2009 | Parks et al. | 244/49 |
| 2010/0077693 A1 | 4/2010 | de Beaupre | |
| 2011/0084174 A1* | 4/2011 | Hemmelgarn et al. | 244/200 |
| 2011/0168324 A1* | 7/2011 | Ender | 156/243 |
| 2012/0048990 A1* | 3/2012 | Sommer | 244/3 |

OTHER PUBLICATIONS

Response to Restriction Requirement dated Mar. 15, 2012 for U.S. Appl. No. 12/633,251, 9 pages.

Amendment submitted with RCE dated Jun. 9, 2011 for U.S. Appl. No. 12/042,443, 16 pages.

USPTO Final Office Action dated Mar. 30, 2011 for U.S. Appl. No. 12/042,443, 8 pages.

USPTO Office Action dated Nov. 10, 2010 for U.S. Appl. No. 12/042,443, 13 pages.

USPTO Notice of Allowance dated Jul. 1, 2011 for U.S. Appl. No. 12/042,443, 7 pages.

Response to Final Office Action dated May 18, 2011 for U.S. Appl. No. 12/042,443, 16 pages.

Response to Office Action dated Feb. 8, 2011 for U.S. Appl. No. 12/042,443, 13 pages.

USPTO Office Action dated Dec. 30, 2011 for U.S. Appl. No. 13/267,614, 10 pages.

USPTO Office Action dated Jun. 15, 2012 for U.S. Appl. No. 13/267,614, 9 pages.

Response to Office Action dated Feb. 8, 2012 for U.S. Appl. No. 13/267,614, 6 pages.

Cadogan et al., "Inflatable Composite Habitat Structures for Lunar and Mars Exploration", ILC Dover, Inc, IAA-98-IAA.13.2.04 49th International Astronautical Congress, Sep.-Oct. 1998, 9 pages.

Cadogan et al., "Morphing Inflatable Wing Development for Compact Package Unmanned Aerial Vehicles", ILC Dover, Inc., AIAA 2004-1807, 45th AIAA/ASME/ASCE/AHS/ASC Structures, Structural Dynamics and Materials Conference, Apr. 2004, 13 pages.

Cadogan et al., "Inflatable and Rigidizable Wings for Unmanned Aerial Vehicles", ILC Dover, Inc., 2nd AIAA "Unmanned Unlimited" Systems, Sep. 2003, 9 pages.

Cadogan et al., "Recent Development and Test of Inflatable Wings", ILC Dover, Inc., AIAA 2006-2139, 47th AIAA/ASME/ASCE/AHS/ASC Structures, Structural Dynamics and Materials Conference, May 2006.

Grant, "The Radar Game: Understanding Stealth and Aircraft Survivability", Copyright 1998, IRIS Independent Research, 59 pages.

Haight et al., "Hybrid Inflatable/Rigidizable Wings for High Altitude Applications", Adherent Technologies, Inc., AIAA 2009-2148, 50th AIAA/ASME/ASCE/AHS/ASC Structures, Structural Dynamics, and Materials Conference, May 2009, 14 pages.

"UAV Wings", Inflatable wings, ILC Dover, Inc., accessed Jul. 10, 2012, 2 pages. http://www.ilcdover.com/UAV-Wings/.

Jacob et al., "Design Limitations of Deployable Wings for Small Low Altitude UAVs", American Institute of Aeronautics and Astronautics, AIAA 2009-745, 47th AIAA Aerospace Sciences Meeting Including the New Horizons Forum and Aerospace Exposition, Jan. 2009, 24 pages.

Jacob et al., "Design of HALE Aircraft Using Inflatable Wings", American Institute of Aeronautics and Astronautics, AIAA 2008-167, 48th AIAA Aerospace Sciences Meeting and Exhibit, Jan. 2008, 16 pages.

Jones et al., "A High-Altitude Test of Inflatable Wings for Low-Density Flight Applications", ILC Dover, Inc., AIAA 2006-1696, Gossamer Spacecraft Forum, May 2006, 13 pages.

Norris et al., "Historical Perspective on Inflatable Wing Structures", American Institute of Aeronautics and Astronautics, AIAA 2009-2145, 50th AIAA/ASME/ASCE/AHS/ASC Structures, Structural Dynamics, and Materials Conference, May 2009, 10 pages.

Scarborough et al., "Development of a Finite Element Model of Warping Inflatable Wings", ILC Dover, Inc., AIAA 2006-1697, AIAA Structures, Structural Dynamics and Materials Conference, May 2006, 19 pages.

Simpson et al., "Aeroelastic Deformation and Buckling of Inflatable Wings under Dynamic Loads", American Institute of Aeronautics and Astronautics, AIAA 2007-2239, 48th AIAA/ASME/ASCE/AHS/ASC Structures, Structural Dynamics, and Materials Conference, Apr. 2007, 22 pages.

Simpson et al., "Inflatable and Warpable Wings for Meso-scale UAVs", American Institute of Aeronautics and Astronautics, AIAA 2005-7161, AIAA Infotech@Aerospace, Sep. 2005, 13 pages.

"Wing warping", Wikipedia, accessed Jul. 10, 2012, 3 pages http://en.wikipedia.org/wiki/Wing_warping.

Lutke et al., "Variable Pitch Airfoils", filed Dec. 8, 2009, U.S. Appl. No. 12/633,251, 45 pages.

Lutke et al., "Inflatable Fuselage", filed Dec. 8, 2009, U.S. Appl. No. 12/633,212, 45 pages.

Lutke et al., "Non-Reflective Wing", filed Dec. 8, 2009, U.S. Appl. No. 12/633,272, 52 pages.

"Inflatable Wings, Gun Launched Observation Vehicle," Vertigo, Inc., Jun. 2003, 2 pages, last accessed Feb. 2008 http://web.archive.org/web/20041030234709/http://vertigo-inc.com/Aeronautical_Systems/GLOV/GLOV.html.

USPTO Notice of Allowance dated Aug. 27, 2012 regarding U.S. Appl. No. 12/633,251, 17 pages.

"Inflatable Wings," Vertigo Inc., dated on or before Mar. 5, 2008, 3 pages, accessed Oct. 19, 2009 http://www.vertigo-inc.com/inflatable_wings/.

Office Action, dated Oct. 16, 2012, regarding USPTO U.S. Appl. No. 12/633,212, 42 pages.

* cited by examiner

VARIABLE PITCH AIRFOILS

This application is a divisional application of U.S. application Ser. No. 12/633,251, filed Dec. 8, 2009, now U.S. Pat. No. 8,342,451, issued on Jan. 1, 2013.

BACKGROUND INFORMATION

1. Field

The present disclosure relates generally to aircraft and, in particular, to airfoils for aircraft. Still more particularly, the present disclosure relates to a method and apparatus for a variable pitch airfoil for an aircraft.

2. Background

An unmanned aerial vehicle (UAV) may be an aircraft that may fly without human operators being present in the aircraft. Unmanned aerial vehicles may come in a number of different shapes, sizes, configurations, and/or characteristics. Unmanned aerial vehicles may, for example, take the form of fixed wing aircraft and/or helicopters.

Unmanned aerial vehicles may be controlled from a remote location. At this remote location, a human operator or a program executed by a computer may generate commands for the unmanned aerial vehicle. Unmanned aerial vehicles also may be controlled using a program running on a computer or other controller on the unmanned aerial vehicle.

Unmanned aerial vehicles may be used for a number of different purposes. Currently, the largest use may be for military applications. Unmanned aerial vehicles may be used to perform missions that may include, for example, without limitation, reconnaissance missions, attack missions, and/or other suitable types of missions.

Unmanned aerial vehicles also may be used in a number of civilian applications. For example, without limitation, unmanned aerial vehicles may be used to perform surveying, firefighting, and other suitable types of missions.

In some cases, it may be desirable to reduce the footprint or size of an unmanned aerial vehicle prior to its use. For example, it may be desirable to pack or stow an unmanned aerial vehicle for launching. The launching of the unmanned aerial vehicle may be by hand, air drop, missile, gun, or other suitable types of delivery systems.

In meeting these types of goals for launching and/or transporting unmanned aerial vehicles, inflatable components have been developed. These inflatable components may provide for more compact packaging for stowing, transportation, and/or launching of the unmanned aerial vehicles. Additionally, these inflatable components also may be designed to provide a desired speed of deployment, while reducing the mass and complexity of the components.

For example, without limitation, wings have been designed using inflatable structures. With inflatable wings, a non-mechanical mechanism for stowing and deploying these types of structures may be present. Further, with inflatable wings, controlled deformations of the wings may be performed using actuation systems that may be located on or within the inflatable wings. These systems may deform and/or otherwise bend the wings to provide the desired amount of lift and/or control of the movement of the unmanned aerial vehicle.

With inflatable wings, durability may be a concern. The durability may involve the ability of inflatable wings to survive when launched by a delivery system, such as a gun or missile. Additionally, the durability of these components also may involve the ability of the components to be reusable over a number of deflations and inflations of these components. The durability of these components also may involve the storage of the components in either a packed or inflated state for extended periods of time in extreme conditions.

Also, when an unmanned aerial vehicle lands or impacts an object, the survivability of the inflatable components may be desirable. Other durability goals may include, for example, without limitation, the ability of inflatable wings to function as desired with different levels of wind gusts and/or currents.

Accordingly, it would be advantageous to have a method and apparatus which takes into account one or more of the issues discussed above, as well as possibly other issues.

SUMMARY

In one advantageous embodiment, an apparatus may comprise an inflatable control surface for an aircraft and an end of the inflatable control surface configured for attachment to a fuselage of the aircraft. The end of the inflatable control surface may be configured to be rotated about an axis to control movement of the aircraft during flight.

In another advantageous embodiment, an aircraft system may comprise a fuselage for an unmanned aerial vehicle, a number of airfoils, a conductive member, a movement system, and a delivery system. Each airfoil in the number of airfoils may have an inflatable section. The inflatable section may be configured to be inflated to an aerodynamic shape and may be comprised of a material selected from at least one of polyurethane, bi-directional polyester film, plastic, a para-aramid synthetic fiber with an airtight liner, nylon with an airtight liner, cloth with wire, and metal threads. Each airfoil in the number of airfoils may have a rigid base section having a first end and a second end. The first end may be associated with the inflatable section to form an inflatable control surface for the unmanned aerial vehicle. The second end may be configured for attachment to a fuselage of the unmanned aerial vehicle and configured to be rotated about an axis to control movement of the unmanned aerial vehicle during flight. A conductive surface may be present at the second end of the rigid base section. The rigid base section and the inflatable section in an inflated configuration may form the inflatable control surface with an airfoil shape. The number of airfoils may form at least one of stabilizers for the unmanned aerial vehicle, a v-shaped tail for the unmanned aerial vehicle, and wings for the unmanned aerial vehicle. The conductive member may be associated with the fuselage and may be configured to electrically contact the conductive surface. The movement system may be configured to rotate the rigid base section. The movement system may comprise a spindle associated with the second end and an actuator connected to the spindle in which the actuator is configured to rotate the spindle to rotate the rigid base section. The actuator may be selected from one of a linear actuator connected to the spindle by a rod and a rotary actuator connected to the spindle. The delivery system may be configured to deliver the unmanned aerial vehicle for flight. The delivery system may be a missile, and the unmanned aerial vehicle may be a payload in the missile.

In yet another advantageous embodiment, a method may be present for moving an airfoil. A desired position may be identified for the airfoil. The airfoil may have an inflatable section in which the inflatable section may be configured to be inflated to an aerodynamic shape. The airfoil may be rotated to the desired position.

In a further advantageous embodiment, a method may be present for moving an airfoil on an unmanned aerial vehicle. A desired position may be identified for the airfoil. The airfoil may have an inflatable section in which the inflatable section is configured to be inflated to an aerodynamic shape. The airfoil may have a rigid base section having a first end and a second end. The first end may be associated with the inflatable section to form an inflatable control surface for the unmanned aerial vehicle. The second end may be configured for attachment to a fuselage of the unmanned aerial vehicle and configured to be rotated about an axis to control movement of the unmanned aerial vehicle during flight. The airfoil may be rotated to the desired position using a movement system. The movement system may comprise a spindle associated with the second end and an actuator connected to the spindle. The actuator may be configured to rotate the spindle to rotate the rigid base section.

The features, functions, and advantages may be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

Figure 1:
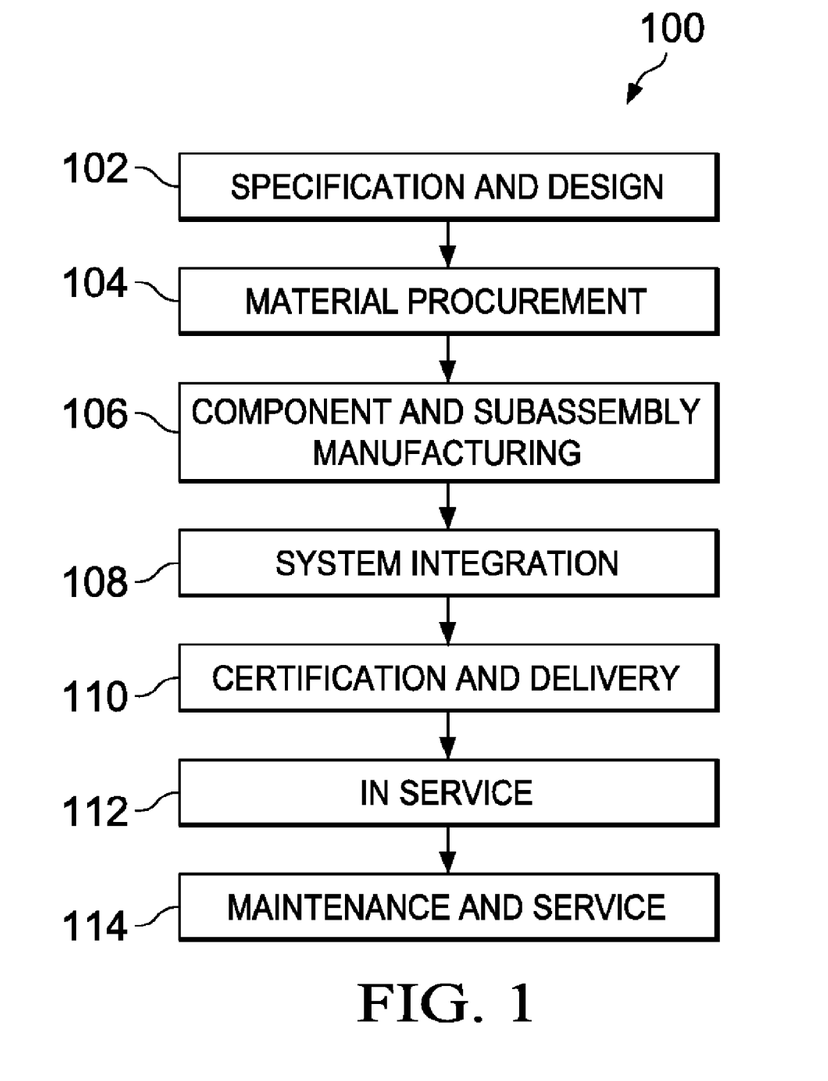
FIG. 1 is an illustration of an aircraft manufacturing and service method in accordance with an advantageous embodiment.
Figure 2:
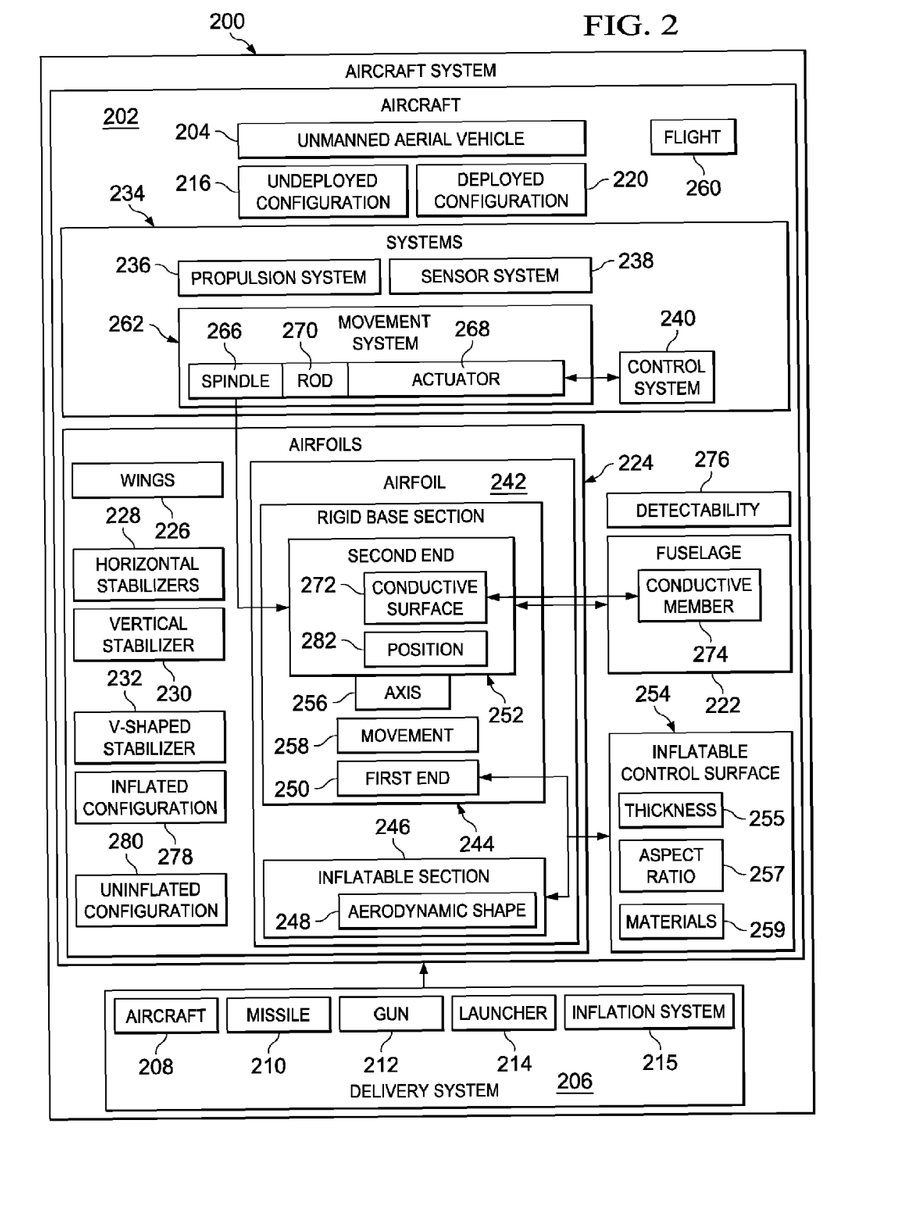
FIG. 2 is an illustration of an aircraft system in accordance with an advantageous embodiment.

Referring more particularly to the drawings, embodiments of the disclosure may be described in the context of aircraft manufacturing and service method 100 as shown in FIG. 1 and aircraft 202 as shown in FIG. 2. Turning first to FIG. 1, an illustration of an aircraft manufacturing and service method is depicted in accordance with an advantageous embodiment. During pre-production, aircraft manufacturing and service method 100 may include specification and design 102 of aircraft 202 in FIG. 2 and material procurement 104.

During production, component and subassembly manufacturing 106 and system integration 108 of aircraft 202 in FIG. 2 may take place. Thereafter, aircraft 202 in FIG. 2 may go through certification and delivery 110 in order to be placed in service 112. While in service 112 by a customer, aircraft 202 in FIG. 2 may be scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, government agency, service organization, and so on.

Apparatus and methods embodied herein may be employed during at least one of the stages of aircraft manufacturing and service method 100 in FIG. 1. As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

In one illustrative example, components or subassemblies produced in component and subassembly manufacturing 106 in FIG. 1 may be fabricated or manufactured in a manner similar to components or subassemblies produced while aircraft 202 in FIG. 2 is in service 112 in FIG. 1. As yet another example, a number of apparatus embodiments, method embodiments, or a combination thereof may be utilized during production stages, such as component and subassembly manufacturing 106 and system integration 108 in FIG. 1.

A number, when referring to items, means one or more items. For example, a number of apparatus embodiments may be one or more apparatus embodiments. A number of apparatus embodiments, method embodiments, or a combination thereof may be utilized while aircraft 202 in FIG. 2 is in service 112 and/or during maintenance and service 114 in FIG. 1. The use of a number of the different advantageous embodiments may substantially expedite the assembly of and/or reduce the cost of aircraft 202 in FIG. 2.

The different advantageous embodiments recognize and take into account a number of different considerations. For example, the different advantageous embodiments recognize and take into account that currently used airfoils, such as wings, may be more complex than desired.

The different advantageous embodiments recognize and take into account that currently used inflatable wings may include actuator systems to control the shape of those wings. The shape of the wings may be controlled to control the flight of the aircraft. In this manner, separate control surfaces, such as horizontal stabilizers, may be unnecessary or changed and designed. These actuator systems may include, for example, wires, actuators, deformable metal strips, and/or other suitable components. The different advantageous embodiments recognize and take into account that these types of systems may not provide a desired level of durability for the wing to perform at desired levels.

Further, the different advantageous embodiments recognize and take into account that a reduction in the visibility or detectability of an aircraft may be desirable. For example, it may be desirable to reduce the ability to detect the aircraft by radar systems or infrared detection systems. The different advantageous embodiments recognize and take into account that the use of actuator systems in currently available inflatable wings may not provide the desired amounts of reduction in the detectability of the aircraft.

The different advantageous embodiments also recognize and take into account that the use of a fully inflatable wing without actuator systems may reduce the functionality of the wing or require other control surfaces to be added to the aircraft. The different advantageous embodiments also recognize and take into account that a fully inflatable wing without support structures may reduce the rigidity of the wing. As a result, the wing may not be suitable for use in all desired environments or may not provide a desired amount of control. Further, this type of wing may introduce design constraints that may not be desirable.

Thus, the different advantageous embodiments provide a method and apparatus for an airfoil. In some advantageous embodiments, an apparatus comprises an inflatable section and a rigid base section. The inflatable section may be configured to be inflated to an aerodynamic shape. The rigid base section may have a first end and a second end. The first end may be associated with the inflatable section to form an inflatable control surface for an aircraft. The second end of the rigid base section may be configured for attachment to a fuselage of the aircraft. Further, the rigid base section also may be configured to be rotated about an axis to control movement of the aircraft during flight.

With reference now to FIG. 2, an illustration of an aircraft system is depicted in accordance with an advantageous embodiment. Aircraft system 200 may include, for example, aircraft 202. Aircraft 202 may be, for example, without limitation, unmanned aerial vehicle 204.

Unmanned aerial vehicle 204 may be produced by aircraft manufacturing and service method 100 in FIG. 1. Unmanned aerial vehicle 204 may be transported and/or launched using delivery system 206. Delivery system 206 also may be manufactured as part of aircraft system 200 for aircraft 202 using aircraft manufacturing and service method 100 in FIG. 1. In these illustrative examples, delivery system 206 may include at least one of aircraft 208, missile 210, gun 212, launcher 214, and/or other suitable delivery systems. Further, delivery system 206 also may include inflation system 215.

Aircraft 202 may be in undeployed configuration 216 for storage and/or delivery by delivery system 206. When deployed or launched by delivery system 206, aircraft 202 may change into deployed configuration 220. Changing aircraft 202 from undeployed configuration 216 to deployed configuration 220 may be performed using inflation system 215.

As illustrated, aircraft 202 may have fuselage 222 and airfoils 224. In these illustrative examples, an airfoil is a device or structure configured to provide at least one of lift for an aircraft and control of an aircraft during flight. For example, an airfoil may be a wing for an aircraft, a control surface, or some other suitable type of structure. A control surface may be, for example, a horizontal stabilizer, a vertical stabilizer, or some other suitable structure.

For example, without limitation, airfoils 224 may take the form of wings 226, horizontal stabilizers 228, vertical stabilizer 230, V-shaped stabilizer 232, and/or other suitable types of airfoils or control surfaces.

In these illustrative examples, aircraft 202 may also include systems 234. Systems 234 may comprise, for example, without limitation, propulsion system 236, sensor system 238, control system 240, and/or other suitable systems.

In these illustrative examples, airfoil 242 in airfoils 224 may comprise rigid base section 244 and inflatable section 246. Inflatable section 246 may be configured to inflate to aerodynamic shape 248. Aerodynamic shape 248 may be a shape that allows airfoil 242 to provide lift and/or control movement of aircraft 202.

Inflatable section 246 may be comprised of a material capable of holding a gas at a pressure when inflatable section 246 is inflated to form aerodynamic shape 248. Further, the material may be selected to have reduced reflectivity with respect to electromagnetic waves. For example, without limitation, the material may be selected from at least one of polyurethane, a bi-directional polyester film, plastic, a para-aramid synthetic fiber with an airtight liner, nylon with an airtight liner, and/or any other suitable material. In other advantageous embodiments, the material may take the form of a cloth with wire or metal threads that form a wire mesh. This wire mesh may form a conductive skin for inflatable section 246. With the conductive skin, inflatable section 246 may be electrically connected to a fuselage.

Rigid base section 244 may have first end 250 and second end 252. First end 250 may be associated with inflatable section 246 to form inflatable control surface 254 for aircraft 202. Second end 252 may be configured to attach to fuselage 222 of aircraft 202. Further, second end 252 may be configured to be rotated about axis 256 to control movement 258 of aircraft 202 during flight 260. Rigid base section 244 may be comprised of a material selected from at least one of a composite material, aluminum, steel, titanium, a plastic, and/or other suitable materials.

Additionally, systems 234 also may include movement system 262. Movement system 262 may be configured to rotate second end 252 of rigid base section 244. In these illustrative examples, movement system 262 may comprise spindle 266 and actuator 268.

Spindle 266 may be associated with second end 252. Actuator 268 may be connected to spindle 266. Actuator 268 may be configured to rotate spindle 266 to rotate second end 252 of rigid base section 244. In this illustrative example, actuator 268 may take the form of a linear actuator, a rotary actuator, and/or some other suitable type of actuator. When actuator 268 takes the form of a linear actuator, actuator 268 may be connected to spindle 266 by rod 270.

In these illustrative examples, conductive surface 272 may be present at second end 252 of rigid base section 244. Conductive surface 272 may conduct electrical currents in these examples. Additionally, conductive member 274 may be associated with fuselage 222. Conductive member 274 may be configured to electrically contact conductive surface 272. Conductive member 274 also may be configured to conduct electrical currents. Conductive surface 272 also may be referred to as a wiping surface. Conductive member 274 may be a wiper. Conductive member 274 and/or conductive surface 272 may be comprised of a material selected from at least one of copper, gold, steel, and/or some other suitable conductive material.

In this manner, conductive surface 272 and conductive member 274 may create a continuous conductive structure between airfoil 242 and fuselage 222 of aircraft 202. Consequently, detectability 276 of aircraft 202 may be reduced. In particular, the reduction of detectability 276 for aircraft 202 may be with respect to radar systems.

In these illustrative examples, airfoil 242 may be changed between inflated configuration 278 and uninflated configuration 280 using inflation system 215.

In inflated configuration 278, control system 240 may control actuator 268. More specifically, control system 240 may control the position of actuator 268 to change position 282 of second end 252 of rigid base section 244. Movement 258 of rigid base section 244 along with inflatable section 246 for airfoil 242 may occur about axis 256. In this manner, movement of airfoil 242 may be used to control aircraft 202 during flight 260.

In the different advantageous embodiments, the rigidity of rigid base section 244 may increase the structural performance of rigid base section 244. In other words, rigid base section 244 may avoid deflection of the surface of rigid base section 244 due to bending. Further, rigid base section 244 may increase the rigidity of the perimeter of airfoil 242. This increased rigidity may allow airfoil 242 to resist deformation by twisting due to torsional forces. Still further, the length of rigid base section 244 may be selected to reduce the bending moment of inflatable section 246. In some advantageous embodiments, rigid base section 244 may have a length of about five percent to about 20 percent of the length of inflatable control surface 254.

Additionally, in the different advantageous embodiments, the rigidity and configuration of rigid base section 244 may be selected to meet observability requirements, packing requirements, and/or a desired structure performance. For example, without limitation, an increased rigidity may provide increased structural performance, but reduced rigidity may provide low observability and increased packing efficiency. Packing requirements may include, for example, without limitation, thickness 255 of inflatable control surface 254, aspect ratio 257 of inflatable control surface 254, and/or materials 259 used for inflatable control surface 254.

The illustration of aircraft system 200 in FIG. 2 is not meant to imply physical or architectural limitations to the manner in which advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, other airfoils, in addition to airfoil 242, may have a rigid base section and an inflatable section similar to airfoil 242 and inflatable section 246. In yet other advantageous embodiments, wings 226 may be implemented using airfoil 242. In still other advantageous embodiments, aircraft 202 may take other forms other than unmanned aerial vehicle 204. In some advantageous embodiments, aircraft 202 may be a manned vehicle. Further, aircraft 202 may have various sizes when in the form of unmanned aerial vehicle 204.

As another example, the movement of airfoil 242, in this example, is about axis 256. In other advantageous embodiments, other types of movement may occur in addition to or in place of rotation about axis 256. For example, airfoil 242 may be translated or moved with or without rotation about axis 256 in some advantageous embodiments.

Figure 3:
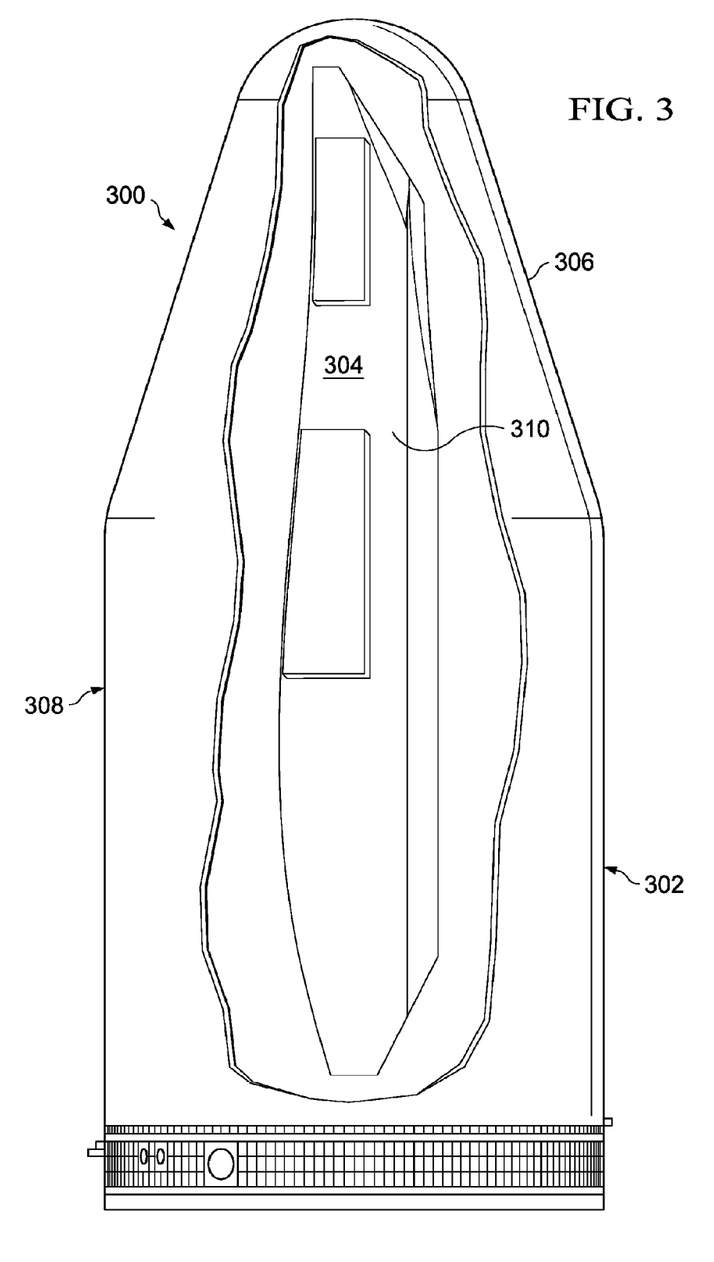
FIG. 3 is an illustration of an aircraft system in accordance with an advantageous embodiment.

With reference now to FIG. 3, an illustration of an aircraft system is depicted in accordance with an advantageous embodiment. In this illustrative example, aircraft system 300 is an example of one implementation for aircraft system 200 in FIG. 2.

In this example, aircraft system 300 is shown in a partially exposed view. Aircraft system 300 may include, for example, without limitation, delivery system 302 and aircraft 304. In this depicted example, delivery system 302 may be missile 306. In FIG. 3, payload section 308 of missile 306 is illustrated with aircraft 304. Aircraft 304, in this example, may be unmanned aerial vehicle 310.

Figure 4:
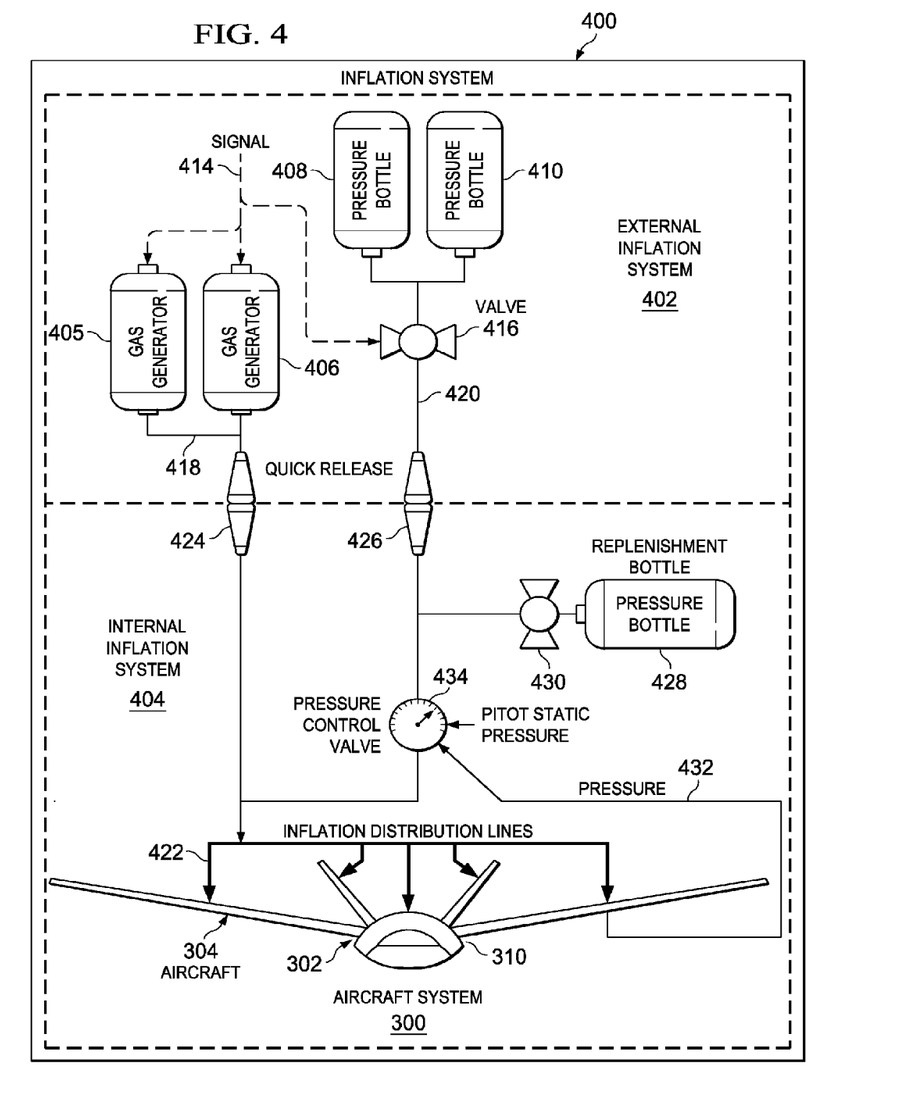
FIG. 4 is an illustration of an inflation system for an aircraft in accordance with an advantageous embodiment.

Turning now to FIG. 4, an illustration of an inflation system for an aircraft is depicted in accordance with an advantageous embodiment. Inflation system 400 is an example of one implementation of inflation system 215 in FIG. 2.

Inflation system 400 may be used to inflate components in unmanned aerial vehicle 310. In this illustrative example, inflation system 400 includes external inflation system 402 and internal inflation system 404. External inflation system 402 may be located in delivery system 302 in these examples. Internal inflation system 404 may be located within aircraft 304.

As illustrated, external inflation system 402 may include, for example, without limitation, a number of different sources of gas. In these examples, external inflation system 402 may include gas generator 405, gas generator 406, pressure bottle 408, and pressure bottle 410.

Gas generator 405 and gas generator 406 may generate gas in a number of different ways. For example, without limitation, these gases may be produced by burning a chemical similar to rocket propellant. Additionally, in some advantageous embodiments, gas generator 405 and gas generator 406 may be an engine in the delivery system that generates gases during operation.

In these illustrative examples, pressure bottle 408 and pressure bottle 410 may store gas in a compressed form. In these illustrative examples, pressure bottle 408 and pressure bottle 410 may store gasses, such as, for example, without limitation, air, nitrogen, helium, and/or other suitable gasses. Gas generator 405 and gas generator 406 may generate gasses with a warmer temperature as compared to gasses in pressure bottle 408 and pressure bottle 410.

In these illustrative examples, signal 414 may be used to cause gas generators 405 and 406 to create gas. Signal 414 also may control valve 416 to deliver gas from pressure bottle 408 and pressure bottle 410. In these depicted examples, gas lines 418 and 420 may connect to inflation distribution lines 422 for aircraft 304. Quick release mechanisms 424 and 426 may allow for external inflation system 402 to detach from internal inflation system 404.

In these illustrative examples, internal inflation system 404 may include pressure bottle 428. Pressure bottle 428 may include gasses similar to those in pressure bottles 408 and 410. Gas may be released from pressure bottle 428 through the control of valve 430.

Pressure 432 for aircraft 304 may be controlled using pressure control valve 434. If pressure 432 increases beyond the desired level, pressure control valve 434 may release gas from aircraft 304. If pressure 432 decreases below a desired level, valve 430 may be operated to introduce gas from pressure bottle 428 into aircraft 304.

The illustration of inflation system 400 in FIG. 4 is not meant to imply physical or architectural limitations to the manner in which other inflation systems may be implemented for use within an aircraft. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, external inflation system 402 may only use one pressure bottle or gas generator instead of both, as illustrated in FIG. 4. In yet other advantageous embodiments, a gas generator, a tank of stored gas, or a compressor may replace pressure bottle 428 in internal inflation system 404. In still other advantageous embodiments, other types of mechanisms may be used in addition to or in place of the one shown for controlling the pressure in aircraft 304.

Figure 5:
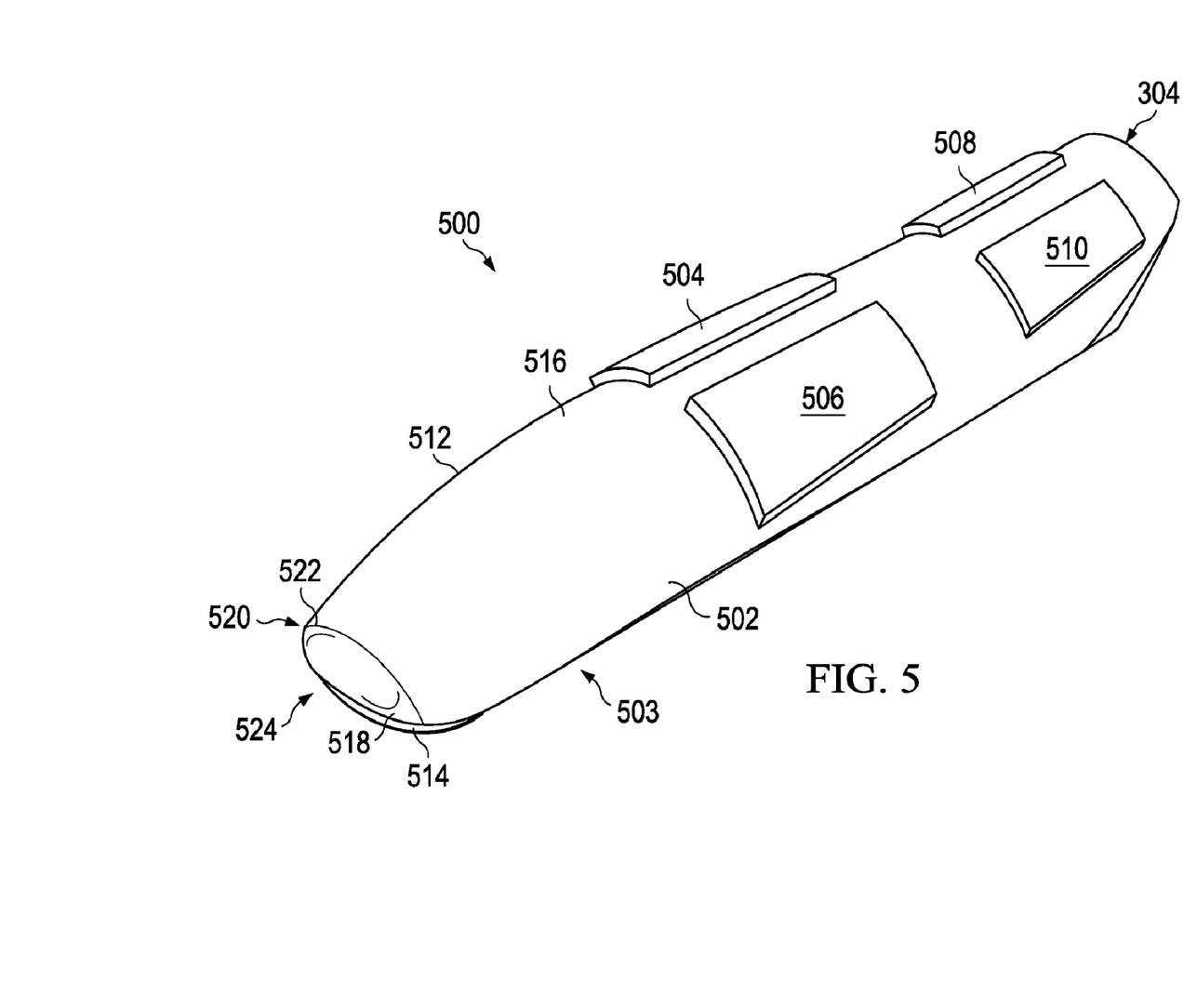
FIG. 5 is an illustration of an aircraft in a stowed configuration in accordance with an advantageous embodiment.

With reference now to FIG. 5, an illustration of an aircraft in a stowed configuration is depicted in accordance with an advantageous embodiment. In this illustrative example, aircraft 304 is shown in stowed configuration 500. Aircraft 304, in this example, may have fuselage 502 and airfoils 503. As illustrated, airfoils 503 may include wing 504, wing 506, stabilizer 508, and stabilizer 510.

Fuselage 502 may include side 512 and side 514. In this example, side 512 has surface 516, and side 514 has surface 518. Side 512 and side 514 meet at edge 520. Edge 520 may take the form of chime 522. In these illustrative examples, edge 520 may have a shape that reduces and/or prevents electromagnetic waves 524 directed at side 514 from reaching side 512.

Figure 6:
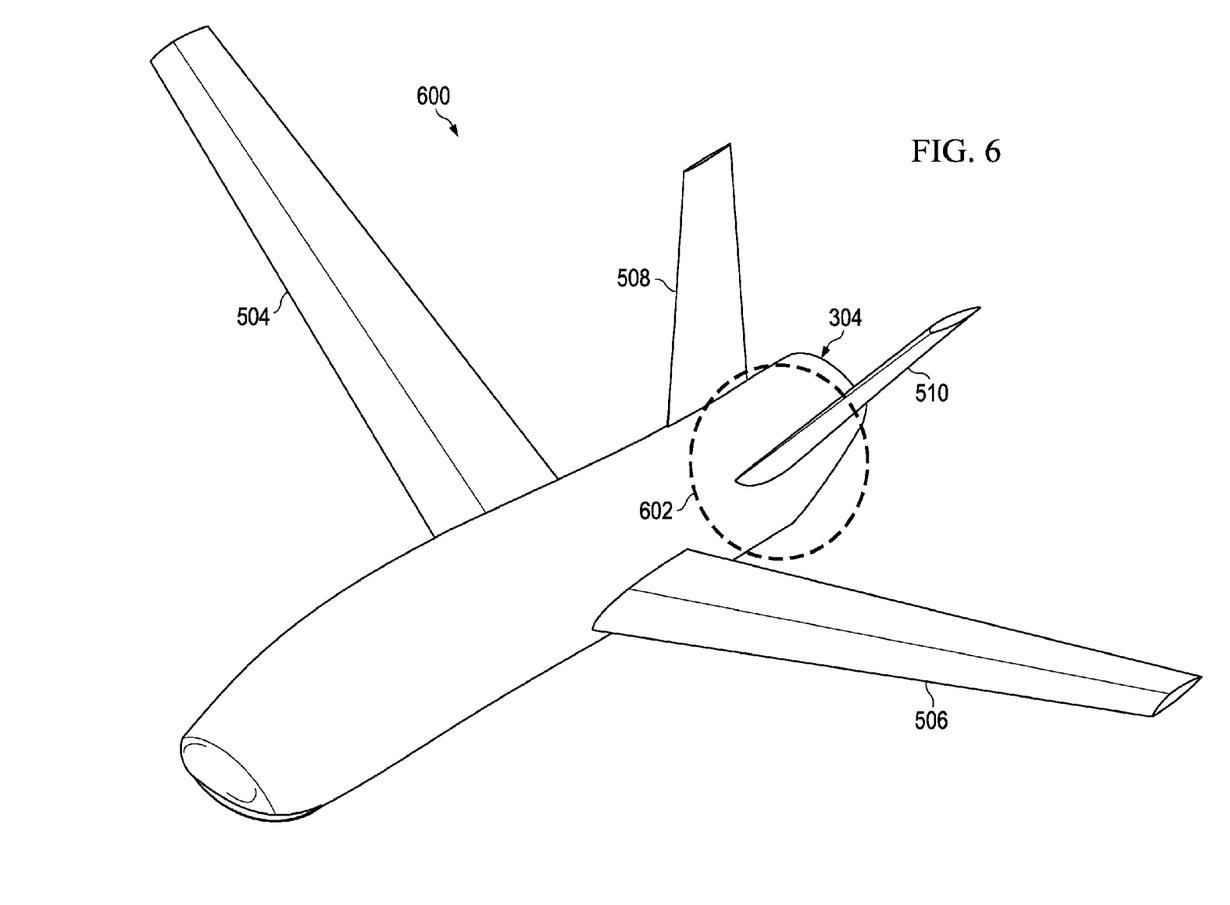
FIG. 6 is an illustration of an aircraft in the deployed configuration in accordance with an advantageous embodiment.

Turning now to FIG. 6, an illustration of an aircraft in the deployed configuration is depicted in accordance with an advantageous embodiment. In this illustrative example, aircraft 304 is shown in deployed configuration 600.

In these advantageous embodiments, stabilizer 508 and stabilizer 510 may be implemented using airfoil 242 in FIG. 2. In some advantageous embodiments, wing 504 and wing 506 also may be implemented using airfoil 242 in FIG. 2.

Figure 7:
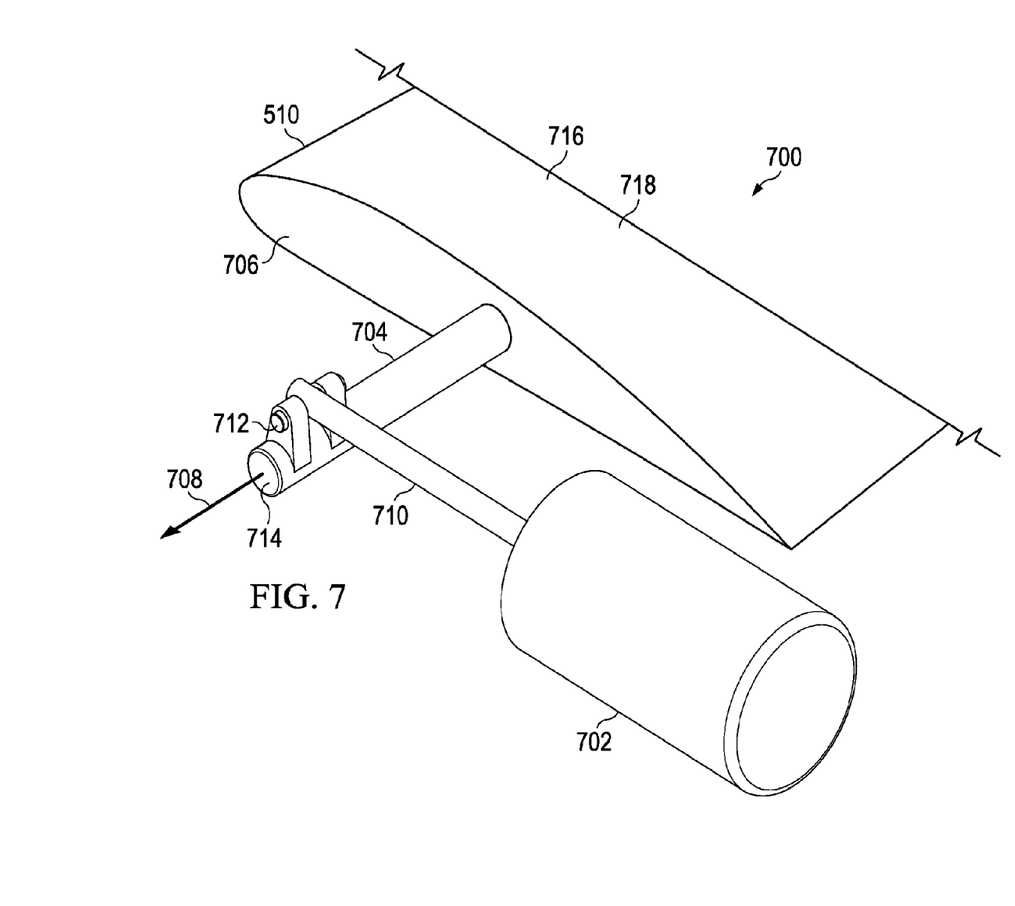
FIG. 7 is an illustration of a movement system for a stabilizer in accordance with an advantageous embodiment.

With reference now to FIG. 7, an illustration of a movement system for a stabilizer is depicted in accordance with an advantageous embodiment. In this illustrative example, an illustration of an exposed portion of section 602 in FIG. 6 is illustrated.

In this illustrative example, movement system 700 comprises actuator 702 and spindle 704. Spindle 704 may be associated with end 706 of stabilizer 510. Spindle 704 may be an elongate member. Spindle 704 may take any shape that may allow actuator 702 to rotate spindle 704 about axis 708. The rotation of spindle 704 about axis 708 may cause rotation or movement of stabilizer 510. In this depicted example, actuator 702 is connected to spindle 704 through rod 710. Rod 710 may be attached to spindle 704 using fastener 712 in these illustrative examples.

Additionally, spindle 704 may have channel 714. Stabilizer 510 may have rigid base section 716, which may have cavity 718. Channel 714 may extend or be in communication with cavity 718. Cavity 718 may reach an inflatable portion of stabilizer 510, which is not shown in this illustration. Channel 714 may receive a gas to inflate stabilizer 510. In some advantageous embodiments, a hose (not shown) may be placed into channel 714.

In this illustrative example, actuator 702 may take the form of a linear actuator. However, in other advantageous embodiments, actuator 702 may take the form of a rotary actuator and/or some other suitable type of actuator.

Figure 8:
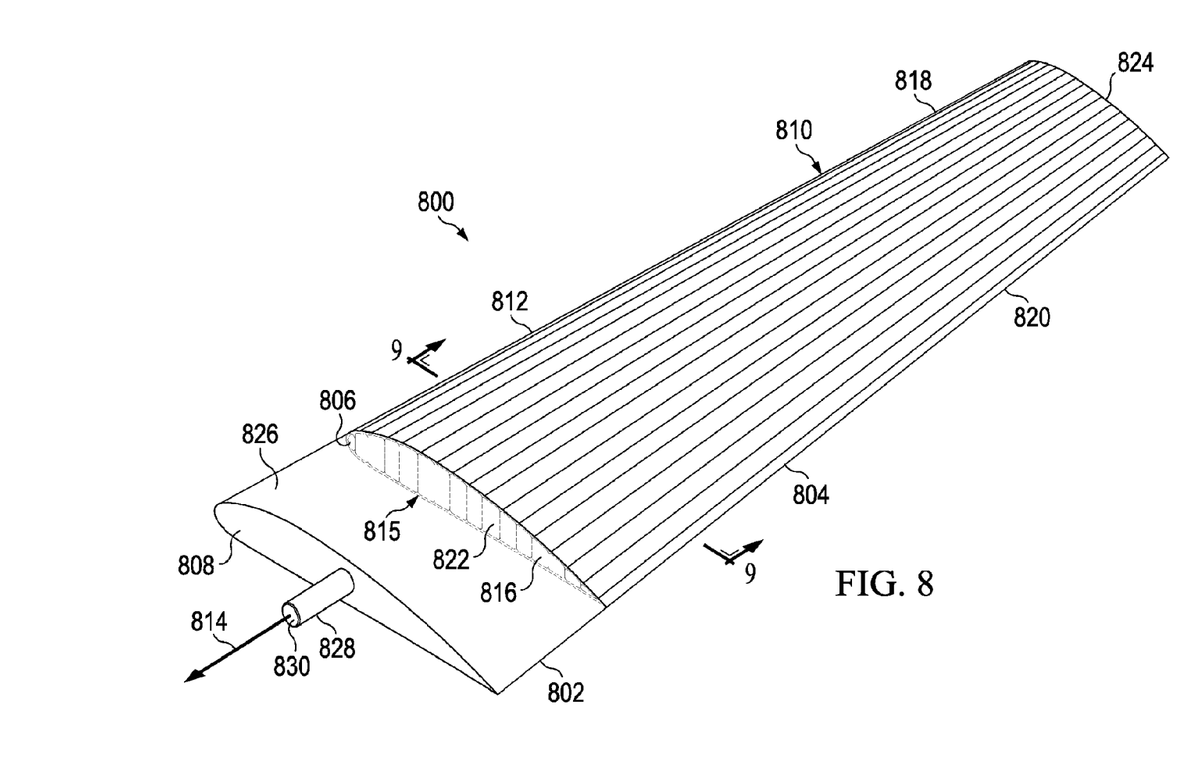
FIG. 8 is an illustration of an airfoil in accordance with an advantageous embodiment.

Turning now to FIG. 8, an illustration of an airfoil is depicted in accordance with an advantageous embodiment. Airfoil 800 is an example of an implementation of airfoil 242 in FIG. 2. In particular, airfoil 800 may be used to implement stabilizer 508 or stabilizer 510 in FIG. 5 in these illustrative examples.

As depicted, airfoil 800 may include rigid base section 802 and inflatable section 804. Rigid base section 802 may have first end 806 and second end 808. In this example, inflatable section 804 may be configured to be inflated to aerodynamic shape 810.

Second end 808 may be configured for attachment to fuselage 502 of aircraft 304 in FIG. 5 in these examples. First end 806 may be associated with inflatable section 804. In this illustrative example, rigid base section 802 may be associated with inflatable section 804 by being attached to each other using fasteners with a sealing gasket, clamped between two rigid elements, bonded using an adhesive, or stitched together. The fasteners used may be, for example, without limitation, mechanical fasteners, such as rivets. Further, in some advantageous embodiments, metallic fibers may be present on at least one of the surfaces of rigid base section 802 and inflatable section 804. These metallic fibers may maintain an electrical connection between inflatable section 804 and rigid base section 802 when these sections are attached to each other.

Rigid base section 802 and inflatable section 804 may form inflatable control surface 812. Further, inflatable control surface 812 may be rotated about axis 814 to control movement of an aircraft during flight.

In this illustrative example, inflatable section 804 may be subdivided into channels 815. Channels 815 may be formed by strips 816, which may extend from side 818 to side 820 of inflatable section 804. Strips 816 also may extend from end 822 to end 824 of inflatable section 804.

In this illustrative example, rigid base section 802 may include cavity 826. Spindle 828 may be attached to second end 808. Spindle 828 may include channel 830, which may allow gas to flow into cavity 826. Cavity 826 may be in communication with inflatable section 804 to allow inflation of inflatable section 804 when gas is introduced into airfoil 800 through channel 830.

Figure 9:
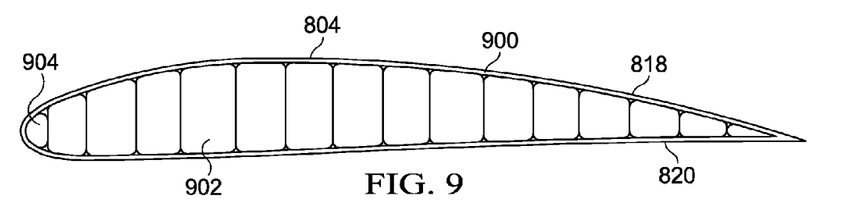
FIG. 9 is an illustration of a cross section of an inflatable section of an airfoil in accordance with an advantageous embodiment.

Turning now to FIG. 9, an illustration of a cross section of an inflatable section of an airfoil is depicted in accordance with an advantageous embodiment. In this illustrative example, a cross-sectional view of inflatable section 804 taken along lines 9-9 in FIG. 8 is depicted in accordance with an advantageous embodiment.

Figure 10:
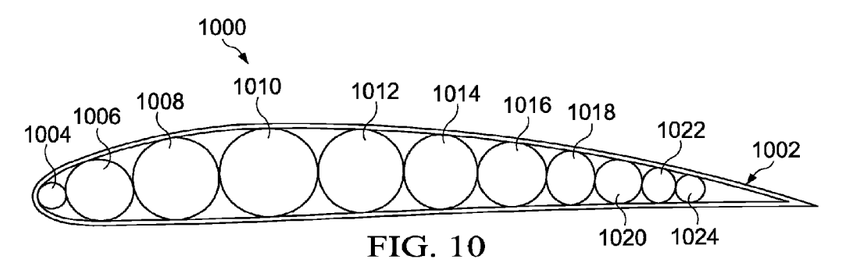
FIG. 10 is an illustration of a cross section of an inflatable portion of an airfoil in accordance with an advantageous embodiment.

Turning now to FIG. 10, an illustration of a cross section of an inflatable portion of an airfoil is depicted in accordance with an advantageous embodiment. In this illustrative example, a cross section of airfoil 1000 is illustrated. Airfoil 1000 may be an example of an implementation for airfoil 242 in FIG. 2. Airfoil 1000 also may be used to implement stabilizer 508 and stabilizer 510 in FIG. 5.

In this example, inflatable section 1002 of airfoil 1000 may include channels 1004, 1006, 1008, 1010, 1012, 1014, 1016, 1018, 1020, 1022, and 1024. These channels may receive gas to inflate inflatable section 1002 in airfoil 1000. In this illustrative example, channels 1004-1024 may have a circular shape, which may be a shape different than channels 815 in FIGS. 8 and 9.

In some advantageous embodiments, channels within channels 815 in FIGS. 8 and 9 and channels 1004-1024 in FIG. 10 may be inflated differently than other channels. For example, different channels may be inflated at different inflation rates and/or to different pressures. In this manner, different sections of airfoil 800 and airfoil 1000 may have different rigidities.

Figure 11:
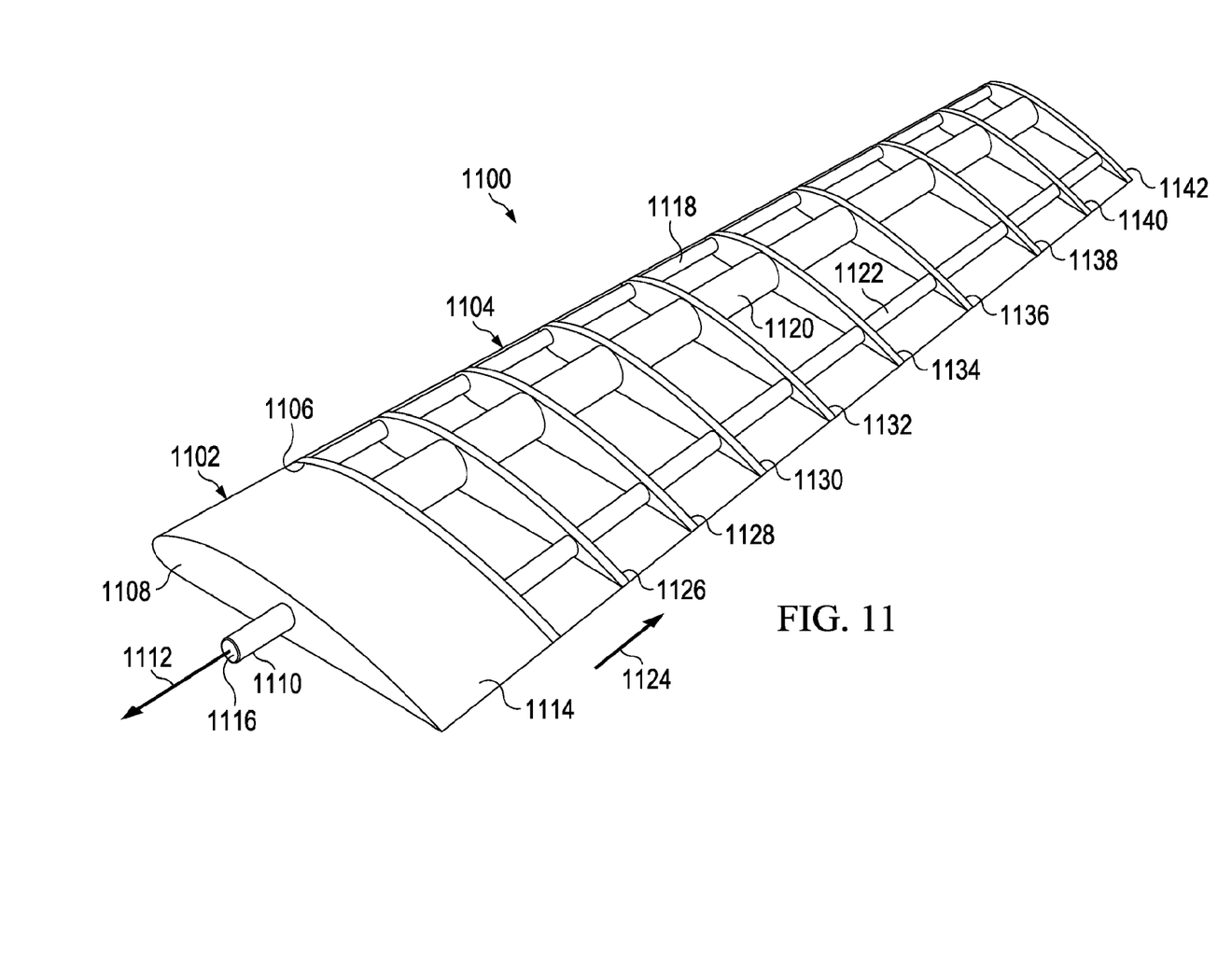
FIG. 11 is an illustration of an airfoil in accordance with an advantageous embodiment.

Turning now to FIG. 11, an illustration of an airfoil is depicted in accordance with an advantageous embodiment. In this illustrative example, airfoil 1100 is another example of another physical implementation for airfoil 242 in FIG. 2. Airfoil 1100 may be used to implement stabilizer 508 and stabilizer 510 in FIG. 5.

As illustrated, airfoil 1100 may include rigid base section 1102 and inflatable section 1104. In this example, inflatable section 1104 is shown in an exposed view. In this illustrative example, rigid base section 1102 may have first end 1106 and second end 1108. Second end 1108 may be configured for attachment to a fuselage of an aircraft. In these illustrative examples, spindle 1110 may be present at second end 1108. Rigid base section 1102 may be rotated about axis 1112 in these illustrative examples. In this illustrative example, rigid base section 1102 may have cavity 1114. Spindle 1110 may have channel 1116, which may be in communication with cavity 1114.

In this illustrative example, inflatable section 1104 may comprise inflatable spars 1118, 1120, and 1122. These inflatable spars may be inflated to extend inflatable section 1104 in the direction of arrow 1124 from rigid base section 1102. In these examples, inflatable section 1104 may have ribs 1126, 1128, 1130, 1132, 1134, 1136, 1138, 1140, and 1142. These ribs may be rigid or flexible and may be attached to inflatable spars 1118, 1120, and 1122.

The illustrations of the airfoils in FIGS. 8-11 are not meant to imply physical or architectural limitations to the manner in which other airfoils may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, holes may be present in the strips forming the channels such that air may flow through all of the channels. In yet other advantageous embodiments, other configurations of channels may be used. For example, in some advantageous embodiments, the channels may have honeycomb shapes. In yet other advantageous embodiments, inflatable spars also may be present in addition to the channels. These inflatable spars may be comprised of a material having greater rigidity than the strips when inflated.

Figure 12:
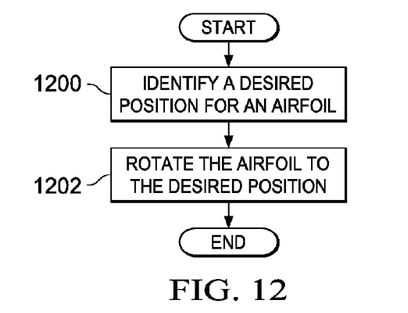
FIG. 12 is an illustration of a flowchart of a process for controlling movement of an airfoil in accordance with an advantageous embodiment.

Turning now to FIG. 12, an illustration of a flowchart of a process for controlling movement of an airfoil is depicted in accordance with an advantageous embodiment. The process illustrated in FIG. 12 may be implemented in aircraft system 200 in FIG. 2. In particular, the process may be implemented using airfoil 242 in FIG. 2.

The process may begin by identifying a desired position for airfoil 242 (operation 1200). In these examples, airfoil 242 has inflatable section 246 in which inflatable section 246 may be configured to be inflated to aerodynamic shape 248. Additionally, airfoil 242 may have rigid base section 244 having first end 250 and second end 252. First end 250 may be associated with inflatable section 246 to form inflatable control surface 254 for aircraft 202. Additionally, airfoil 242 may be rotated about axis 256 to control movement 258 of aircraft 202 during flight 260.

After the desired position has been identified, the process may rotate airfoil 242 to the desired position (operation 1202), with the process terminating thereafter.

In these illustrative examples, the process illustrated in FIG. 12 may be performed after airfoil 242 is inflated into inflated configuration 278. In other illustrative examples, airfoil 242 may be rotated into the desired position at a desired angle before airfoil 242 is inflated into inflated configuration 278.

The flowchart and block diagrams in the different depicted embodiments illustrate the architecture, functionality, and operation of some possible implementations of apparatus and methods in different advantageous embodiments. In this regard, each block in the flowchart or block diagrams may represent a module, segment, function, and/or a portion of an operation or step. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

Thus, the different advantageous embodiments provide a method and apparatus for controlling the movement of an aircraft. In the different advantageous embodiments, an airfoil having a rigid base section in addition to an inflatable section may be employed. Through the use of the rigid base section, increased rigidity for the airfoil may be present as compared to an inflatable section without a rigid base section. Further, with the use of a rigid base section, the airfoil may be rotated about an axis or otherwise positioned to provide lift and/or control movement of an aircraft.

Additionally, in this manner, the use of other systems to control the shape or position of the airfoil may be avoided. As a result, the airfoil and the aircraft as a whole may be less detectable by sensor systems, such as radar systems.

The description of the different advantageous embodiments has been presented for purposes of illustration and description, and it is not intended to be exhaustive or limited to the embodiments in the form disclosed. Many modifications and variations will be apparent to those of ordinary skill in the art.

Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:
1. A method for moving an airfoil, the method comprising:
    identifying a desired position for the airfoil in which the airfoil has an inflatable section in which the inflatable section is configured to be inflated to an aerodynamic shape, wherein the airfoil has a rigid base section having a first end and a second end in which the first end is associated with the inflatable section to form an inflatable control surface for an aircraft and in which the second end is configured for attachment to a fuselage of the aircraft and configured to be rotated about an axis to control movement of the aircraft during flight; and rotating the airfoil to the desired position.

2. The method of claim 1, wherein the airfoil is rotated to the desired position using a movement system.

3. The method of claim 2, wherein the movement system comprises a spindle associated with the second end and an actuator connected to the spindle, wherein the actuator is configured to rotate the spindle to rotate the rigid base section.

4. A method for moving an airfoil on an unmanned aerial vehicle, the method comprising:

identifying a desired position for the airfoil in which the airfoil has an inflatable section in which the inflatable section is configured to be inflated to an aerodynamic shape; and a rigid base section having a first end and a second end in which the first end is associated with the inflatable section to form a inflatable control surface for the unmanned aerial vehicle and the second end is configured for attachment to a fuselage of the unmanned aerial vehicle and configured to be rotated about an axis to control movement of the unmanned aerial vehicle during flight; and rotating the airfoil to the desired position using a movement system in which the movement system comprises a spindle associated with the second end and an actuator connected to the spindle in which the actuator is configured to rotate the spindle to rotate the rigid base section.

* * * * *